US 8,072,942 B2

Dec. 6, 2011

(12) United States Patent
Gaal et al.

(54) CODE CHANNEL MANAGEMENT IN A WIRELESS COMMUNICATIONS SYSTEM

(75) Inventors: Peter Gaal, San Diego, CA (US); Edward G. Tiedemann, Jr., Concord, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1305 days.

(21) Appl. No.: 10/723,688

(22) Filed: Nov. 26, 2003

(65) Prior Publication Data

US 2005/0124348 A1    Jun. 9, 2005

(51) Int. Cl.
*H04B 7/216* (2006.01)
*H04B 1/00* (2006.01)

(52) U.S. Cl. ......... 370/335; 375/133; 375/134; 375/137

(58) Field of Classification Search .................. 370/335, 370/330–334
See application file for complete search history.

(56) References Cited

U.S. PATENT DOCUMENTS

| 32,905 A | 7/1861 | Baran |
|---|---|---|
| 4,330,857 A | 5/1982 | Alvarez, III et al. |
| 4,392,220 A | 7/1983 | Hirosaki et al. |
| 5,299,190 A | 3/1994 | LaMaire et al. |
| 5,442,625 A | 8/1995 | Gitlin et al. |
| 5,504,773 A | 4/1996 | Padovani et al. |
| 5,522,013 A | 5/1996 | Vanska |
| 5,533,013 A | 7/1996 | Leppanen |
| 5,703,902 A | 12/1997 | Ziv et al. |
| 5,751,725 A | 5/1998 | Chen |
| 5,781,583 A | 7/1998 | Bruckert et al. |
| 5,799,010 A | 8/1998 | Lomp et al. |
| 5,859,840 A | 1/1999 | Tiedemann, Jr. et al. |
| 5,946,633 A | 8/1999 | McAlinden |
| 5,991,279 A | 11/1999 | Haugli et al. |
| 6,005,851 A | 12/1999 | Craddock et al. |
| 6,005,855 A | 12/1999 | Zehavi et al. |

(Continued)

FOREIGN PATENT DOCUMENTS

EP    1035676 A    9/2000

(Continued)

OTHER PUBLICATIONS

3GPP TS 25.211 V3.7.0 (Jun. 2001) , 3$^{rd}$ Generation Partnership Project Technical Specification Group Radio Access Network Physical Channels and Mapping of Transport Channels onto Physical Channels (FDD), pp. 1-45, XP0002902457.

(Continued)

*Primary Examiner* — Patrick Edouard
*Assistant Examiner* — Huy C Ho
(74) *Attorney, Agent, or Firm* — D. Scott Juneau

(57) ABSTRACT

Systems and techniques are disclosed relating to communications. The systems and techniques involve separating a plurality of subscriber stations into first and second groups, a different first code from a plurality of orthogonal codes to each of the subscriber stations in the first group, assigning each of the subscriber stations in the first group either its allocated first code or a first sub-code derived from its allocated first code, to support a dedicated channel, and assigning a second sub-code derived from one of the first codes to support a communications channel to one of the subscriber stations in the second group. A second code may be used to support a dedicated channel to the second subscriber station.

27 Claims, 8 Drawing Sheets

U.S. PATENT DOCUMENTS

| | | | |
|---|---|---|---|
| 6,108,550 | A | 8/2000 | Wiorek et al. |
| 6,173,005 | B1 | 1/2001 | Kotzin et al. |
| 6,201,798 | B1 | 3/2001 | Campanella et al. |
| 6,272,124 | B1 | 8/2001 | Ahn et al. |
| 6,289,228 | B1 | 9/2001 | Rotstein et al. |
| 6,317,413 | B1 | 11/2001 | Honkasalo |
| 6,335,922 | B1 | 1/2002 | Tiedemann, Jr. et al. ..... 370/335 |
| 6,377,809 | B1 | 4/2002 | Rezaiifar et al. |
| 6,424,631 | B1 | 7/2002 | Czaja et al. |
| 6,469,993 | B1 | 10/2002 | Seo et al. |
| 6,473,619 | B1 | 10/2002 | Kong et al. |
| 6,477,157 | B1 | 11/2002 | Kim et al. |
| 6,519,260 | B1 | 2/2003 | Galyas et al. |
| 6,542,481 | B2 | 4/2003 | Foore et al. |
| 6,552,996 | B2 | 4/2003 | Kim et al. |
| 6,675,016 | B2 | 1/2004 | Lucidarme et al. |
| 6,700,881 | B1 | 3/2004 | Kong et al. |
| 6,707,804 | B2 | 3/2004 | Proctor, Jr. |
| 6,768,728 | B1 | 7/2004 | Kim et al. |
| 6,804,521 | B2 | 10/2004 | Tong et al. |
| 6,834,047 | B1 | 12/2004 | Yoon et al. |
| 6,850,514 | B1 | 2/2005 | Dick et al. |
| 6,870,824 | B1* | 3/2005 | Kim et al. ..................... 370/342 |
| 6,901,062 | B2* | 5/2005 | Scherzer et al. .............. 370/335 |
| 6,917,581 | B2 | 7/2005 | Proctor, Jr. et al. |
| 6,930,981 | B2 | 8/2005 | Gopalakrishnan et al. |
| 6,963,540 | B2 | 11/2005 | Choi et al. |
| 6,975,666 | B2 | 12/2005 | Affes et al. |
| 6,996,056 | B2 | 2/2006 | Chheda et al. |
| 6,996,069 | B2 | 2/2006 | Willenegger |
| 6,996,075 | B2 | 2/2006 | Santhoff et al. |
| 7,031,741 | B2 | 4/2006 | Lee et al. |
| 7,058,038 | B2 | 6/2006 | Yi et al. |
| 7,130,284 | B2 | 10/2006 | Lee et al. |
| 7,167,460 | B2 | 1/2007 | Zehavi et al. |
| 7,218,617 | B1 | 5/2007 | Usuda et al. |
| 7,254,397 | B2 | 8/2007 | Tiedemann, Jr. et al. |
| 7,319,690 | B2 | 1/2008 | Wu et al. |
| 7,349,375 | B2 | 3/2008 | Gerakoulis |
| 7,352,796 | B1 | 4/2008 | Von Der Embse |
| 7,356,022 | B2 | 4/2008 | Takano et al. |
| 7,430,191 | B2 | 9/2008 | Subrahmanya et al. |
| 7,599,440 | B2 | 10/2009 | Won et al. |
| 2001/0006515 | A1 | 7/2001 | Lee et al. |
| 2001/0012301 | A1 | 8/2001 | Yi et al. |
| 2001/0021169 | A1 | 9/2001 | Kim |
| 2001/0024482 | A1 | 9/2001 | Tiedemann, Jr. et al. |
| 2001/0053140 | A1 | 12/2001 | Choi et al. |
| 2002/0021692 | A1 | 2/2002 | Huh et al. |
| 2002/0067692 | A1 | 6/2002 | Yun et al. |
| 2002/0097697 | A1 | 7/2002 | Bae et al. |
| 2002/0110101 | A1 | 8/2002 | Gopalakrishnan et al. |
| 2002/0122398 | A1 | 9/2002 | Jou |
| 2002/0141367 | A1 | 10/2002 | Hwang et al. |
| 2002/0160781 | A1 | 10/2002 | Bark et al. |
| 2002/0196867 | A1 | 12/2002 | Yoon |
| 2003/0063583 | A1 | 4/2003 | Padovani et al. |
| 2003/0067964 | A1 | 4/2003 | Li |
| 2003/0078010 | A1 | 4/2003 | Davis |
| 2003/0114162 | A1 | 6/2003 | Chheda et al. |
| 2003/0161286 | A1 | 8/2003 | Li |
| 2005/0050427 | A1 | 3/2005 | Jeong et al. |
| 2005/0084112 | A1 | 4/2005 | Kim et al. |
| 2005/0164663 | A1 | 7/2005 | Santhoff et al. |
| 2005/0250521 | A1* | 11/2005 | Joshi et al. ..................... 455/466 |
| 2006/0120322 | A1* | 6/2006 | Lindskog et al. ............. 370/329 |
| 2006/0209674 | A1 | 9/2006 | Chen et al. |

FOREIGN PATENT DOCUMENTS

| | | |
|---|---|---|
| EP | 1035677 A1 | 9/2000 |
| EP | 1061680 A1 | 12/2000 |
| JP | 11502690 T | 3/1999 |
| JP | 11234170 A | 8/1999 |
| JP | 2001016644 A2 | 1/2001 |
| JP | 2001510297 A | 7/2001 |
| JP | 2001517049 T | 10/2001 |
| WO | WO9746044 A1 | 12/1997 |
| WO | WO0033589 A1 | 6/2000 |
| WO | WO0042723 A1 | 7/2000 |
| WO | WO0054443 A1 | 9/2000 |
| WO | WO0135550 A1 | 5/2001 |
| WO | WO0169952 A1 | 9/2001 |
| WO | WO0235735 A2 | 5/2002 |

OTHER PUBLICATIONS

Baer, "Open multi-rate radio interface architecture based on CDMA" Oct. 12, 1993, Universal Personal Communications, 1993. Personal Communications: Gateway to the 21st Century. Conference Record. 2nd International Confernece on Ottawa, Ont., Canada 12.

International Search Report and Written Opinion—PCT/US04/39686—International Search Authority—European Patent Office—Apr. 6, 2005.

Internet Protocol, DARPA Internet Protocol Specification, Sep. 1981.

Fossa C E et al: "A Dynamic Code Assignment Algorithm for Quality of Service in 3G Wireless Networks" Wireless Communications and Networking Conference, 2002. WCNC2002. 2002 IEEE, Piscataway, NJ, USA IEEE, Mar. 17, 2002, vol. 1, pp. 1-6, XP010585724.

Oguz Sunay M et al "Provision of Variable Data Rates in Third Generation Wideband DS CDMA Systems" Wireless Communications and Networking Conference, 1999. WCNC. 1999 IEEE New Orleans, LA, USA Sep. 21-24, US, pp. 505-509, XP010353838.

* cited by examiner

CODE CHANNEL MANAGEMENT IN A WIRELESS COMMUNICATIONS SYSTEM

BACKGROUND

1. Field

The present invention relates generally to communications, and more specifically, to systems and techniques for managing code channel assignments in a wireless communications system.

2. Background

Modern communications systems are designed to allow multiple users to share a common communications medium. One such communications system is a Code Division Multiple Access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, and thereby, spreads the signal over the entire spectrum. The transmitted signals may be separated in the receiver by a correlator using a corresponding code to de-spread the desired signal. The undesired signals, whose codes do not match, contribute only to noise.

In spread-spectrum communications, fixed base stations are generally dispersed throughout an access network to support wireless communications with various user devices. The access network may be divided into regions known as cells with a base station serving each cell. In high traffic applications, the cell may be further divided into sectors with a base station serving each sector. In this configuration, the base station may assign one or more dedicated channels using Walsh codes to each user within its cellular region to support voice and data communications over a forward link transmission. A forward link transmission refers to a transmission from the base station to a user and a reverse link transmission refers to a transmission from a user to the base station. One or more shared channels may also be used by the base station with its own distinct Walsh code. Additional Walsh code assignments may be reserved for various signaling and system support functions.

There is a limited number of Walsh codes available to any given base station, and thus the number of channels, including dedicated and shared channels, is limited for a given code space. In CDMA systems of the past, the forward link capacity was limited by the mutual interference between multiple users, and therefore, the code space was sufficient for the number of supportable channels. However, recent advances in technology has reduced the effects of interference, allowing for additional simultaneous users, and thus increasing demand for more codes to support additional channels.

Moreover, with the tremendous increase in wireless communications over the past years, there has been an ever increasing demand for higher data rate services to support web browsing, video applications, and the like. Often this demand is met by using multiple dedicated channels to carry data from the base station to the user with each channel having a distinct Walsh code. In some instances, high data rate services may be supported by variable Walsh spreading. Variable Walsh spreading entails using shorter length Walsh codes for higher data rate transmissions. Using a shorter length Walsh code, however, precludes using all longer codes that contain the chip pattern of the shorter code, thereby depleting multiple Walsh codes.

Increased demand for codes, reduced available codes, or a combination of the two could result in an insufficient number of Walsh codes to channelize the forward link. Thus, the capacity of the system may be limited in situations where, due to advances in interference mitigation, additional users and/or increased data throughput might otherwise be available. Accordingly, there is a need in the art for an efficient methodology for managing code allocations.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following description, various systems and techniques will be described in the context of a CDMA communications system using Walsh codes to channelize the forward link. While these techniques may be well suited for use in this type of application, those skilled in the art will readily appreciate that these systems and techniques may be applied to any spread-spectrum communications environment. Accordingly, any reference to a Walsh code management methodology in a CDMA communications system is intended only to illustrate various inventive aspects of the present invention, with the understanding that these inventive aspects have a wide range of applications.

Figure 1:
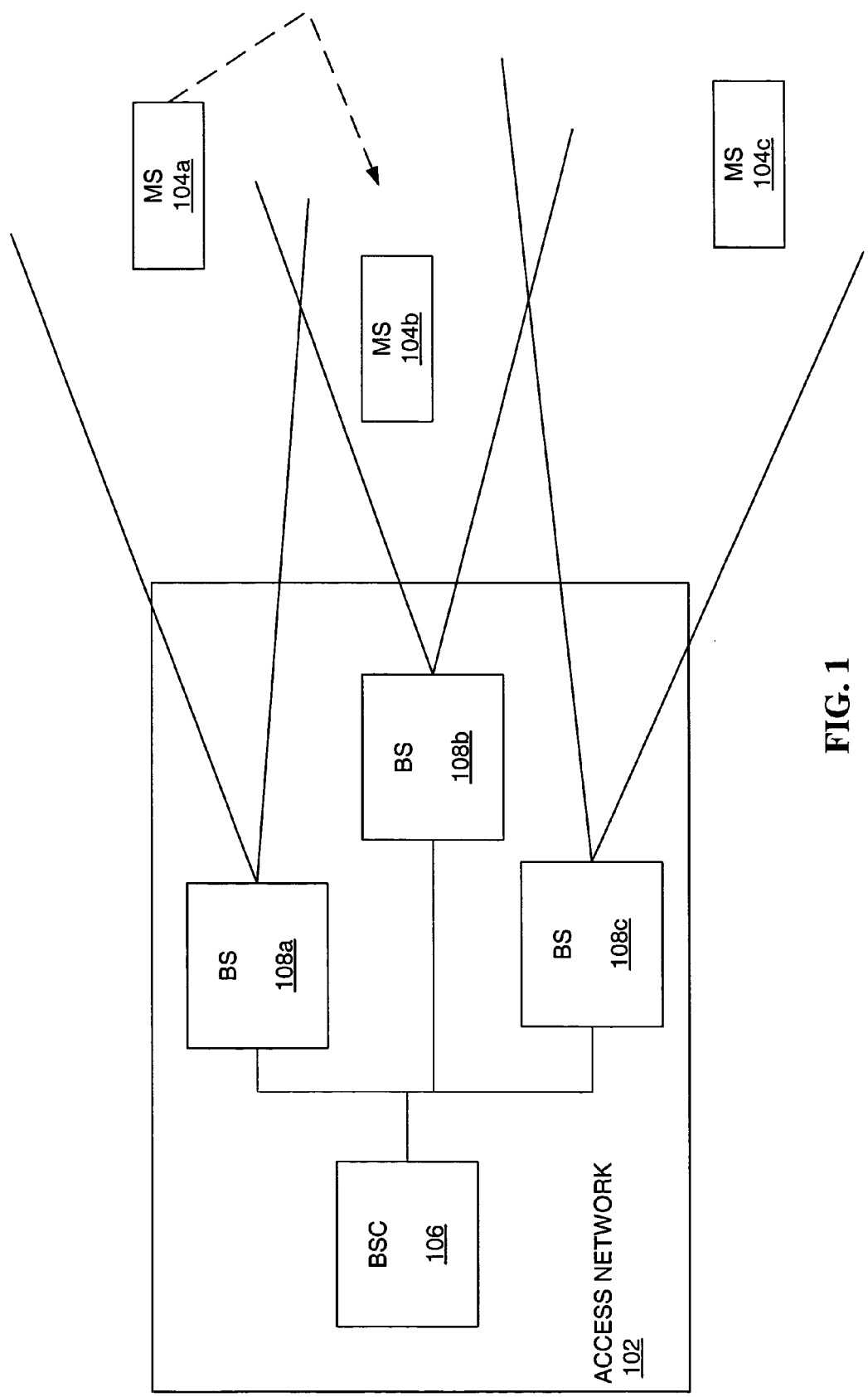
FIG. 1 is a conceptual block diagram of an embodiment of CDMA communications system.

FIG. 1 is a conceptual block diagram of an embodiment of a CDMA communications system. An access network 102 may be used to support wireless communications with multiple user devices 104a-104c. The access network 102 may also be connected to additional networks outside the access network, such as the Internet, a corporate intranet, a Public Switched Telephone Network (PSTN), or the like. The user device 104, commonly referred to as a subscriber station, may be any type of device that may communicate with the access network 102 including a mobile telephone, a computer, a modem, a personal digital assistant, or any other similar device.

The access network 102 is shown with a Base Station Controller (BSC) 106 supporting several base stations 108a-108c dispersed throughout a geographic region. The geographic region may be subdivided into smaller regions known as cells with a base station serving each cell. In high traffic applications, the cell may be further divided into sectors with a base station serving each sector. Although not shown in FIG. 1, the access network 102 may employ numerous BSCs, each supporting any number of base stations, to extend the geographic reach of the access network 102. The BSC 106 may be used to coordinate the activities of multiple base stations, as well as provide an interface to the networks outside the access network 102.

In CDMA communication systems, Walsh codes are commonly used to separate multiple subscriber stations in communication with a base station. Each subscriber station may be assigned a distinct Walsh code during call set-up to support forward link communications over a dedicated traffic channel. The Walsh code may be any length depending on the particular application and overall design constraints. A short Walsh code reduces processing time whereas a long Walsh code increases code gain. The length of the Walsh code also has an impact on system capacity. There are only as many Walsh codes as the code length. Thus, if a Walsh code length of 64 is used, which is very common in today's CDMA communication systems, then there are only 64 Walsh codes available. This limits the number of available channels in the forward link.

Traditionally, the Walsh code length has been selected to accommodate the data rate of the forward link communications. In variable data rate systems, the Walsh code length may be selected to accommodate the maximum data rate. This approach, however, may result in Walsh code resources being underutilized for lower data rates. An efficient methodology for Walsh code assignments in a variable data rate system may be used to reduce or eliminate the potential for underutilization of the Walsh code space for low data rates. A CDMA communications system using a variable rate vocoder is just one example of a system that could benefit from the various systems and techniques disclosed throughout this disclosure to efficiently manage Walsh code assignments.

A variable rate vocoder is typically used to reduce mutual interference among multiple users operating in the same cellular region by transmitting voice with the least amount of data to sustain acceptable voice quality. An Enhanced Variable Rate Codec (EVRC) is a common example. An EVRC transmits voice using eighth, quarter, half, and full rate frames. During periods of silence, eighth rate frames may be transmitted. The power required to transmit eighth rate frames, and thus the interference introduced into the cellular region, is lower than when higher rate frames are transmitted. During periods of active speech, a variety of higher rate frames may be transmitted. As it turns out, on the average, eighth rate and full rate frames are used predominantly, and quarter and half rate frames are used less frequently.

A Selectable Mode Vocoder (SMV) is another example of a vocoder. The SMV makes more efficient use of the medium rate frames (i.e., quarter and half rates), thus reducing the frequency of the full rate frames. The result is that the average rate of a SMV may be less than the average rate of an EVRC. From an interference standpoint, the capacity may be improved.

As more efficient vocoders become standard technology, greater improvements may be realized in system capacity through reduced power usage by lowering the average voice rate. Yet, with today's technology, these vocoders use up the same amount of resources in terms of Walsh code space because their required peak rate remains unchanged. To more efficiently utilize the Walsh code space, various systems and techniques will be described to manage Walsh code assignments in a manner that takes into consideration the data rate of the forward link communications. Although these systems and techniques will be described in the context of a variable rate vocoder, those skilled in the art will be readily able to apply these principles to any variable rate data scheme. Moreover, these systems and techniques are not limited to managing Walsh code assignments in the forward link, but may be applied to any type of code assignments in either the forward or reverse link.

Figure 2:
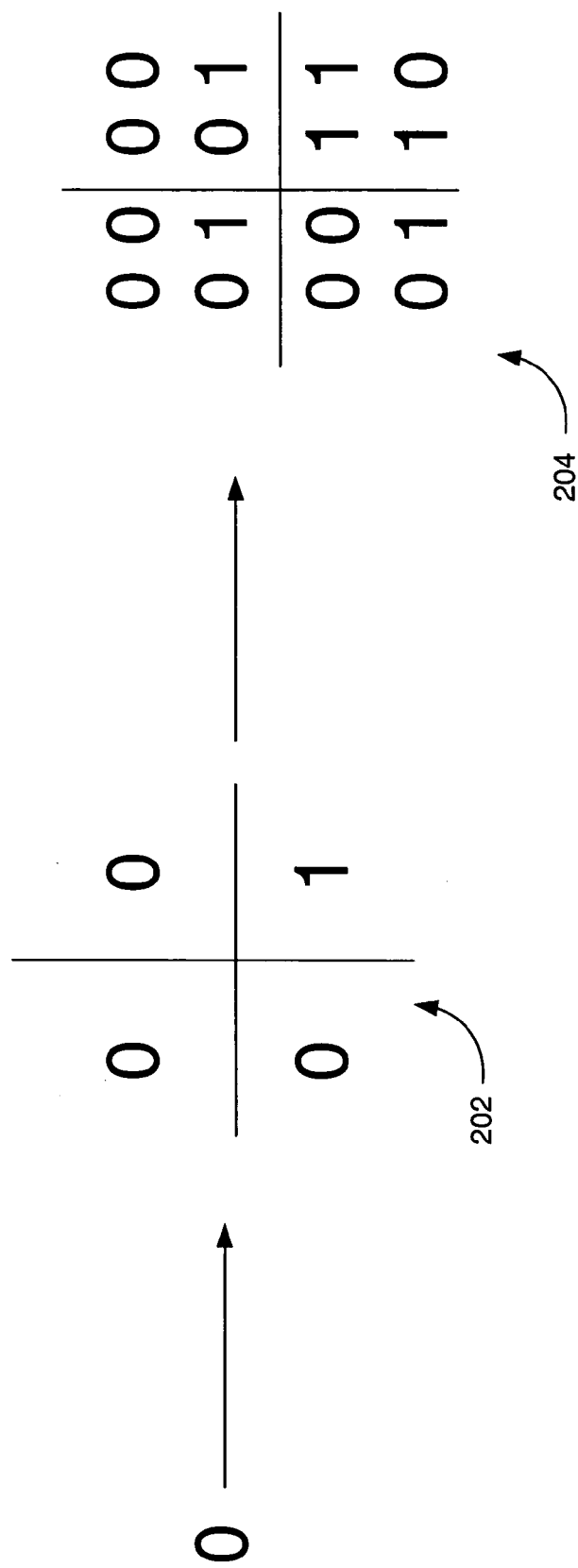
FIG. 2 is a conceptual diagram illustrating the creation of orthogonal codes.

Before describing various systems and techniques for managing Walsh code assignments, it is useful to briefly discuss some fundamental principles of Walsh codes. Walsh codes are orthogonal codes. This means that Walsh codes have zero cross-correlation. Zero cross-correlation is obtained if the product of the two codes, summed over the length of the codes, is zero. Referring to FIG. 2, Walsh codes may be easily generated by starting with a seed "0", repeating the "0" horizontally and vertically, and complimenting the "0" diagonally, to generate two Walsh codes 202 having a length of two. This is often referred to as a 2×2 Walsh code. A 4×4 Walsh code 204 may then be generated by repeating the 2×2 Walsh code 202 horizontally and vertically, and complimenting the 2×2 Walsh code 202 diagonally. This process may be repeated until a Walsh code having the desired length is derived. In the case of many conventional CDMA communication systems, that would be a 64×64 Walsh code.

In variable rate vocoder applications, the Walsh code length may be selected to support a full rate frame. The frame rate is a measure of the volume of information being transmitted, typically measured in bits per second. Depending on the encoding and modulation scheme, one or more symbols may be generated for each voice bit. The volume of symbols being transmitted is commonly referred to as the symbol rate, and corresponds to the frame rate. Lower symbol rates may use longer Walsh codes to maintain a constant chip rate. Accordingly, a ½ rate voice frame may be spread with a Walsh code that is twice as long as the Walsh code for a full rate voice frame. By way of example, if a full rate voice frame is spread with a Walsh code having a length of 64, than a ½ rate voice frame may be spread with a Walsh code having a length of 128. Similarly, a ¼ rate voice frame may be spread with a Walsh code having a length of 256, and a ⅛ rate voice frame may be spread with a Walsh code having a length of 512.

Figure 3:
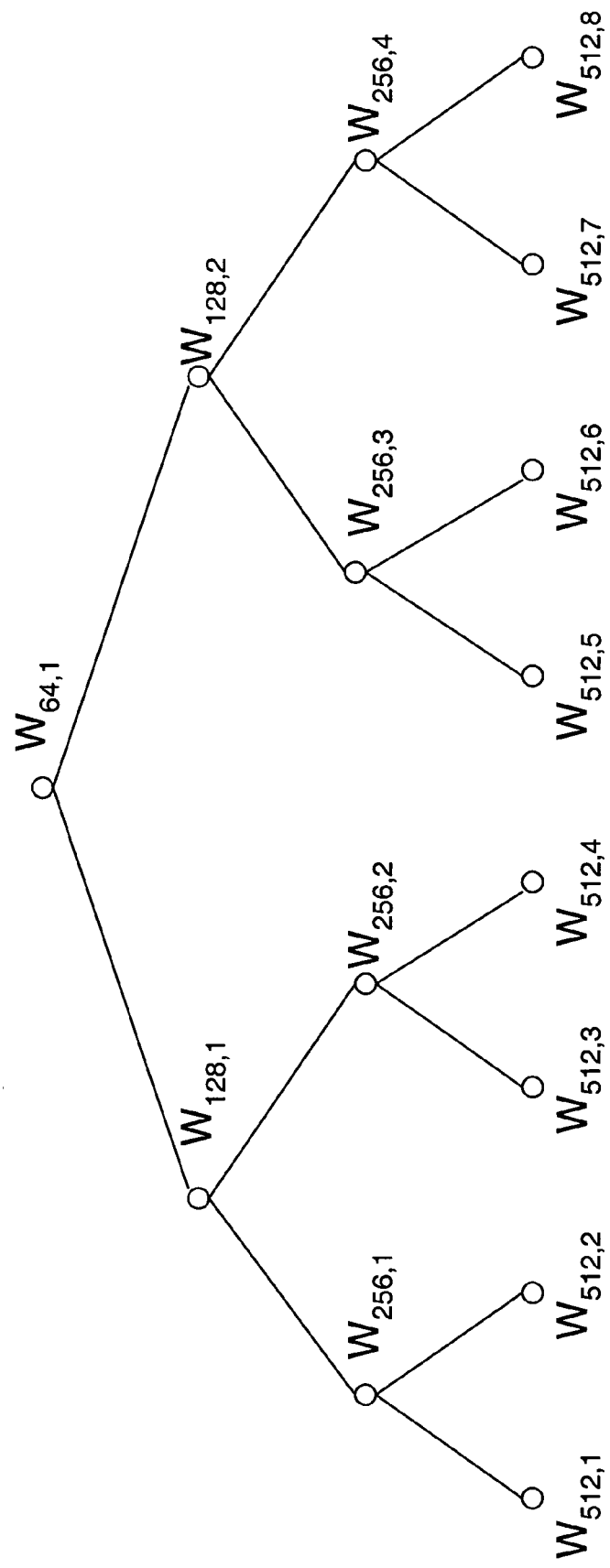
FIG. 3 is a conceptual diagram illustrating a hierarchical tree structure used to model a Walsh code having a length of 64.

The tree structure for recursively constructing Walsh codes of successfully longer lengths may be exploited to efficiently assign Walsh codes in a variable rate vocoder environment. This concept is best understood with reference to FIG. 3. FIG. 3 is a hierarchical tree structure used to model a full rate Walsh code having a length of 64. A Walsh code $W_{L,index}$, is located at a node in the tree structure identified by the length (L), and an index (index) identifying one of the Walsh codes of a particular length. Any particular Walsh code is orthogonal to all other Walsh codes in the tree structure, except for those of greater length branching from the Walsh code and reciprocally, for those of shorter length from which the Walsh code is derived. Thus, for example, four Walsh codes $W_{256,1}$-$W_{256,4}$ with a length of 256 may be assigned. This means that a single Walsh code may be used to support four ¼ rate voice frames. Alternatively, if a Walsh code having a length of 128 is assigned, $W_{128,1}$ for example, then only two Walsh codes with a length of 256 remain available: $W_{256,3}$ and $W_{256,4}$. The Walsh codes branching from the assigned code $W_{128,1}$ with longer lengths are not orthogonal to the assigned Walsh code $W_{128,1}$, and therefore, may not be used to spread other channels. The unavailable Walsh codes include $W_{64,1}$, $W_{256,1}$, $W_{256,2}$ $W_{512,1}$, $W_{512,2}$, $W_{512,3}$, and $W_{512,4}$. Thus, in this second example with the Walsh code $W_{128,1}$ being assigned, the remaining possible Walsh code assignments include a number of possibilities which are given in Table 1 below.

TABLE 1

| Case | Available Walsh Code Assignments |
|---|---|
| A | $W_{128,2}$ |
| B | $W_{256,3}$; $W_{256,4}$ |
| C | $W_{256,3}$; $W_{512,7}$; $W_{512,8}$ |
| D | $W_{256,4}$; $W_{512,5}$; $W_{512,6}$ |
| E | $W_{512,5}$; $W_{512,6}$; $W_{512,7}$; $W_{512,8}$ |

The use of longer Walsh codes to support lower rate voice frames tends to increase the user capacity for a given Walsh code space. The increase in capacity will be determined by the average frame rate of the subscriber stations operating within the base station's cellular region. By way of example, if the average frame rate is equal to ½, the base station will be able to support, on the average, 128 subscriber stations with a 64×64 Walsh code. In reality, a number of Walsh codes may be required to support overhead and signaling functions, leaving less Walsh codes available to support forward link traffic. However, the number of subscriber stations that may be supported should still be significantly higher than the number of Walsh codes. As a result, significant improvements in user capacity may be achieved through an efficient management of the Walsh code resources.

A Walsh code management scheme may be implemented in any number of ways. Several examples will be presented below in the context of CDMA communications systems with a 64×64 Walsh code to channelize the forward link. Probably, the most straightforward approach in terms of complexity involves an arbitrary Walsh code assignment to each subscriber stations based on the voice frame rate. Thus, if a subscriber station is in need of a Walsh code to support a ½ frame rate, the 64 full rate Walsh codes could be searched in an arbitrary manner until an available Walsh code having a length of 128 is found.

To effectively manage the Walsh code assignments based on the frame rate of the vocoder for each subscriber station, the Walsh codes may need to be re-assigned on a frame-by-frame basis. The re-assignment of Walsh codes on a frame-by-frame basis, however, tends to consume valuable resources. By way of example, additional forward link power may be required to signal the Walsh code assignments to the subscriber stations. To minimize the demand on resources, a Walsh code management scheme may be implemented wherein only a portion of the subscriber stations are signaled Walsh code assignments on a frame-by-frame basis. The signaling of Walsh codes on a frame-by-frame basis may be limited to those subscriber stations having good geometry with the serving base station to reduce power overhead. This could include all subscriber stations that are not actively engaged in a soft handoff.

Soft handoff is the process of establishing communications with a new base station before breaking existing communications with the original base station. Referring back to FIG. 1, the soft handoff process may be initiated as the subscriber station 104a moves away from its serving base station 108a along the broken line 110 and towards a target base station 108b. More specifically, the soft handoff process may be initiated by detecting, at the subscriber station 104a, an increase in the strength of a pilot signal from the target base station 108b as the subscriber station moves away from its serving base station 108a. When the pilot signal strength reaches a threshold, the subscriber station 104a reports this information back to the BSC 106 through its serving base station 108a. The target base station 108b may then be added to an active set maintained at the BSC 106. The BSC 106 may then direct the target base station 108b to establish communications with the subscriber station 104a. As a result, the subscriber station 104a may communicate with the BSC 106 through both the serving and target base stations 108a and 108b. The communications from both the serving and target base stations 108a and 108b may be combined at the subscriber station 104a to increase processing gain. This mode of communication may continue until the signal strength of the pilot signal from the serving base station 108a decreases to a level that causes the BSC 106 to remove the serving base station 108a from the active set and instruct the serving base station 108a to tear down communications with the subscriber station 104a.

Figure 4:
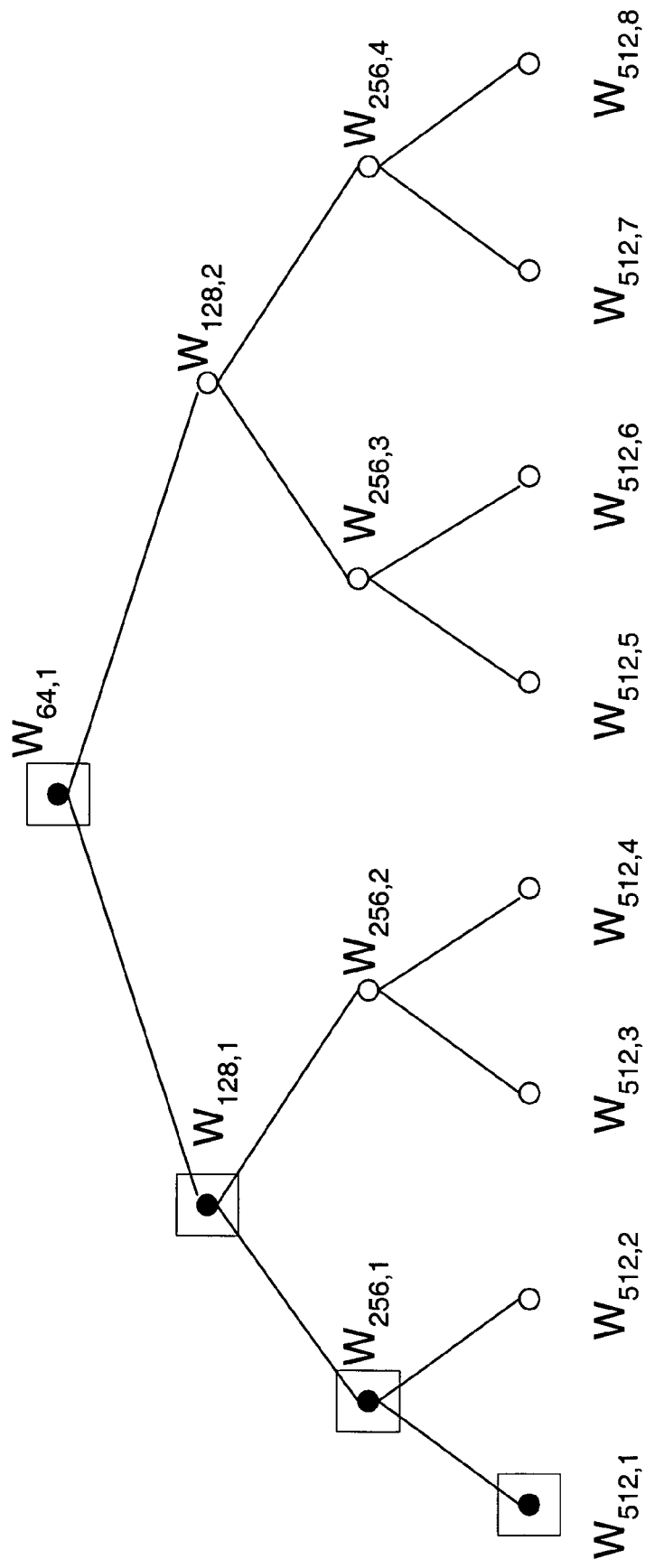
FIG. 4 is a conceptual diagram illustrating a hierarchical tree structure used to illustrate an example of Walsh code assignments for a subscriber station in soft handoff.

Each subscriber station engaged in soft handoff may be allocated a full rate Walsh code by its serving base station from which all frame-by-frame Walsh code assignments are made. Referring to FIG. 4, the Walsh code assignment from each base station may be fixed to the leftmost branch of the subtree rooted at the full rate Walsh code. By way of example, if a ½ frame rate is transmitted, the Walsh code $W_{128,1}$ may be assigned, if a ¼ frame rate is transmitted, the Walsh code $W_{256,1}$ may be assigned, and if a ⅛ frame rate is transmitted, the Walsh code $W_{512,1}$ may be assigned. Each of these Walsh codes $W_{128,1}$, $W_{258,1}$, and $W_{512,1}$ may be derived by concatenating multiples copies of the full rate Walsh code $W_{64,1}$. Since each frame rate has a unique Walsh code, there is no ambiguity at the subscriber station as to the Walsh code assignment once the frame rate is determined.

Once the Walsh code assignments have been made to those subscriber stations in soft handoff, the leftover Walsh code space may be opportunistically assigned to the remaining subscriber stations. By way of example, if a subscriber station engaged in soft handoff is assigned Walsh code $W_{128,1}$ from its allocated full rate Walsh code to support a ½ frame rate, then Walsh code $W_{128,2}$ may be available for assignment to one of the remaining subscriber stations. The Walsh code assignment $W_{128,2}$ may be signaled to that subscriber station at the beginning of the frame or some other opportune time.

In some cases, one or more of the remaining subscriber stations may require a full rate frame. In that case, the unused Walsh space from two or more full rate Walsh codes may be used. This approach provides a high degree of flexibility in Walsh code assignments, but may significantly increase the signaling overhead. In order to reduce the signaling overhead without significantly compromising flexibility, the Walsh code assignments to each of the remaining subscriber stations may be constrained to one full rate Walsh code. The full rate Walsh code may be signaled to the subscriber station from the serving base station on a frame-by-frame basis. A dedicated forward link traffic channel may be assigned to each of the remaining subscriber stations to handle overflow. A Walsh code having a length of 512, or any other length, may be used to support the dedicated forward link traffic channel.

Figure 5:
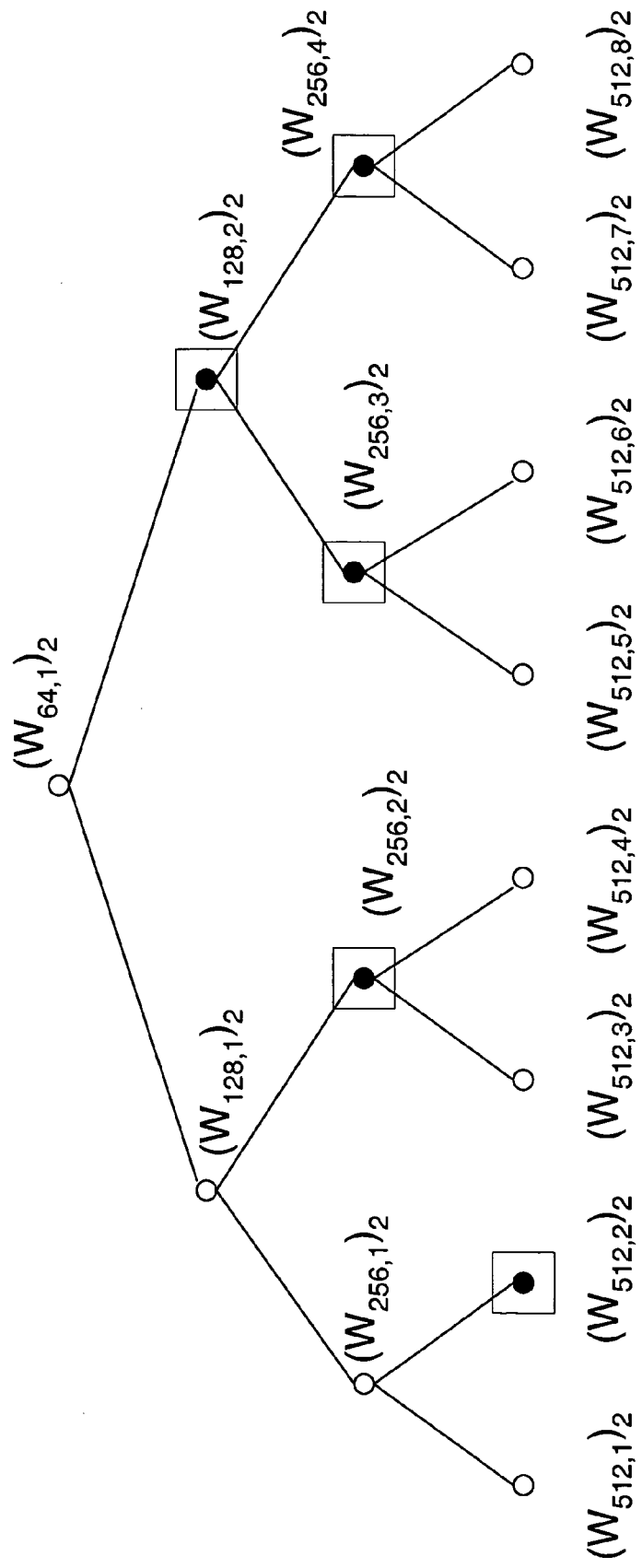
FIG. 5 is a conceptual diagram illustrating a hierarchical tree structure used to illustrate an example of Walsh code assignments for a subscriber station with good geometry to a serving base station.

An example of Walsh code assignments to a remaining subscriber station will now be described in connection with FIG. 5. FIG. 5 is a hierarchical tree structure used to model a full rate Walsh code having a length of 64. In the following example, the remaining subscriber station is assigned a dedicated Walsh code having a length of 512 to support a dedicated forward link traffic channel. The dedicated Walsh code for the subscriber station in this example is designated $(W_{512,1})_1$, where the index $(\ )_1$ means a first one on the 64 full rate Walsh codes. The dedicated forward link traffic channel is sufficient to carry ⅛ rate voice frames. However, should the voice transmitted to the subscriber station require a higher frame rate, unused Walsh codes from a full rate Walsh code allocated to a subscriber station in soft handoff may be assigned to support supplemental forward link traffic channels. In this case, the full rate Walsh code may be signaled to the subscriber station by the serving base station. The subscriber station may use blind rate and code detection to find the Walsh code assignments. Assuming that a subscriber station engaged in soft handoff is assigned Walsh code $(W_{512,1})_2$, where the index $(\ )_2$ means a second one of the 64 full rate Walsh codes, the possible combination of Walsh code assignments to support the dedicated and supplemental forward link traffic channels are given in Table 2 below.

TABLE 2

| Requested Rate | Assigned Walsh codes |
| --- | --- |
| Full rate | $(W_{512,1})_1, (W_{512,2})_2, (W_{256,2})_2, (W_{128,2})_2$ |
| Half rate | $(W_{512,1})_1, (W_{128,2})_2$ |
| Quarter rate | $(W_{512,1})_1, (W_{256,2})_2$; or $(W_{512,1})_1, (W_{256,3})_2$; or $(W_{512,1})_1, (W_{256,4})_2$ |
| Eight rate | $(W_{512,1})_1$ |

Figure 6:
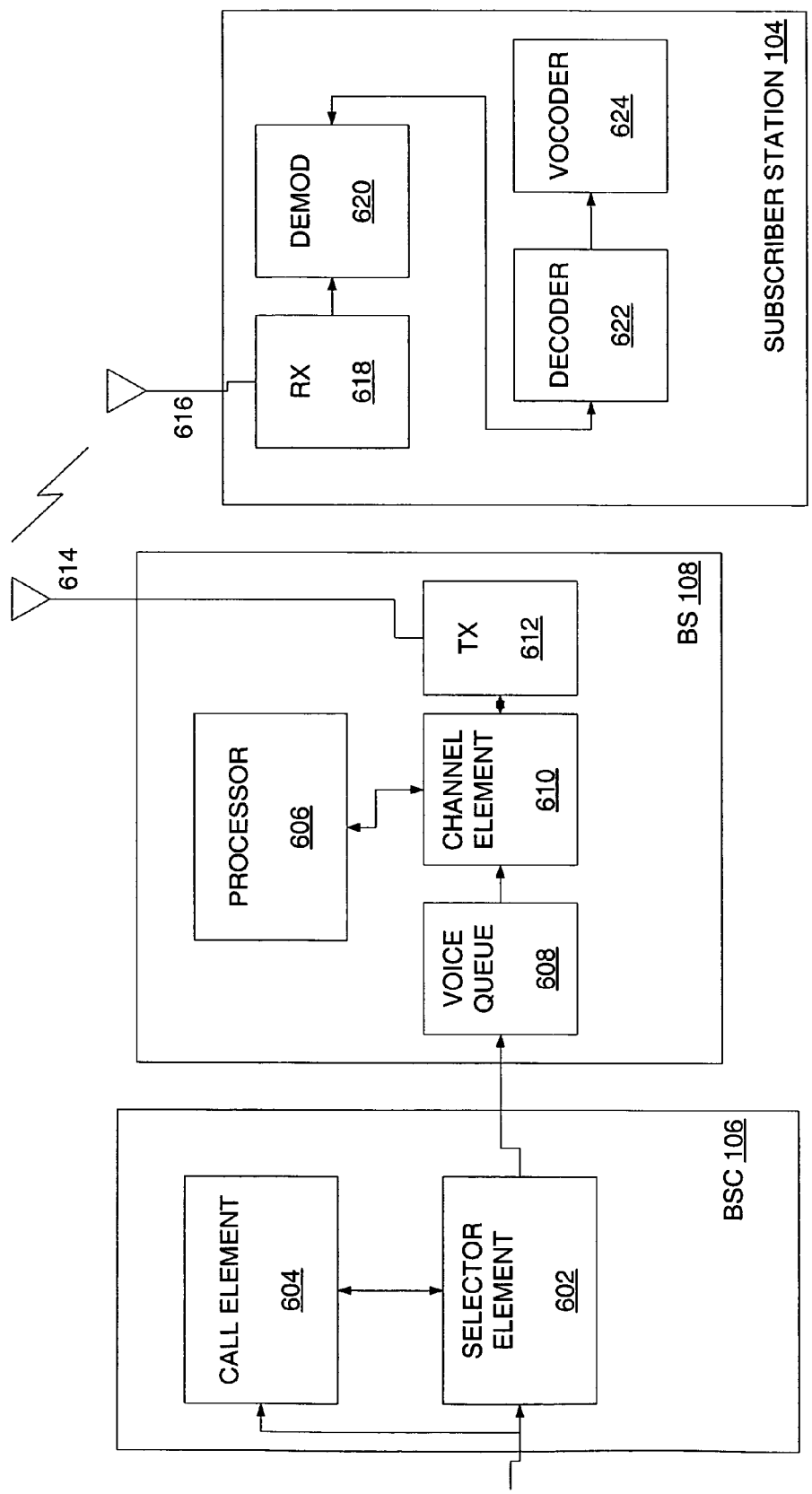
FIG. 6 is a simplified functional block diagram illustrating an embodiment of various subsystems for a CDMA communications system.

FIG. 6 is a simplified functional block diagram illustrating an embodiment of various subsystems for a CDMA communications system. The BSC 106 may include many selector elements, although only one selector element 602 is shown for simplicity. One selector element is dedicated to communications with each subscriber station through one or more base stations. When a call is initiated, a call element 604 may be used to prompt the base station 108 to establish a connection between the selector element 602 and the subscriber station 104. During the exchange of signaling messages, the subscriber station 104 may report back to the selector element 602 the pilot signals detected from various base stations. The selector element 602 may be used to maintain the active set for the subscriber station 104. The active set includes each base station whose pilot signal strength exceeds a threshold. The call element 604 may be used to engage every base station in the active set to support communications between the selector element 602 and the subscriber station 104.

As part of the call set-up procedures, a processor 606 in the base station 108 may be used to assign the subscriber station to one of two groups depending on the subscriber station's soft handoff status. The soft handoff status of the subscriber station 104 may be ascertained from the active set in the BSC 106. If the active set for the subscriber station 104 includes multiple base stations, then the processor 606 may determine that the subscriber station 104 will initially be in soft handoff and assign the subscriber station 104 to a group of subscriber stations in soft handoff. If, on the other hand, the active set for the subscriber station 104 includes only one base station, then the processor 606 may determine that the subscriber station 104 will not initially be engaged in soft handoff and assign the subscriber station 104 to a group of subscriber stations with good geometry. The processor 606 may then re-allocate full rate Walsh codes to each subscriber station in the soft handoff group. The processor 606 may also re-assign low rate Walsh codes to each of the subscriber stations in the good geometry group to support dedicated forward link traffic channels. The base station 108 may then signal the new allocations and assignments to the various subscriber stations in its cellular region.

The signaling of the new full rate Walsh code allocations to the subscriber stations involved in soft handoff may add certain complexities to the Walsh code management scheme. Because of the poor geometry of these subscriber stations, the signaling power may need to be increased. Alternatively, the processor 606 may divide the subscriber stations involved in soft handoff into multiple groups, with each group being served by common base stations. By grouping together subscriber stations in communication with common base stations, the signaling from the base stations may be the same, and therefore, combined at the subscriber station to increase the processing gain. This may be accomplished by a processor algorithm in each base station that makes the same logical Walsh code assignments to each subscriber station in the group. The physical Walsh code assignment from each base station may then be mapped to the logical Walsh code at the individual subscriber stations.

The processor 606 may also be configured to monitor and periodically change the composition of the groups to accommodate a changing communications environment. The composition of the groups may be changed when either a subscriber station served by the base station 108 enters into a soft handoff with a target base station, or a subscriber station completes a soft handoff to the base station 108. These events may be detected by the processor 606 by monitoring the active set in the BSC 106 for each subscriber station in the base station's cellular region. The composition of the groups may also be changed when the call processor 604 prompts the base station 108 to terminate an existing call with a subscriber station.

Every time the composition of the groups are changed, the processor 606 may re-allocate full rate Walsh codes to each subscriber station in the soft handoff group, and re-assign low rate Walsh codes to each subscriber station in the good geometry group. The low rate Walsh codes may be used by the subscriber stations in the good geometry group to support dedicated forward link traffic channels. The base station 108 may then signal the new allocations and assignments to the various subscriber stations.

The selector element 602 may also be configured to receive voice communications for the subscriber station 104 in a Pulse Code Modulation (PCM) format from the access network. The selector element 602 may include a variable rate vocoder (not shown) configured to convert the PCM voice into voice frames using any known voice compression algorithm. The voice frames may be provided from the selector element 602 to the base station 108.

The base station 108 may include a voice queue 608 which buffers the voice frames from the selector element 602 before transmission to the subscriber station 104. The voice frames may be released from the queue 608 and provided to a channel element 610. The channel element 610 may be configured to determine the various frame rates of the voice frames released from the queue and provide this information to the processor 606. Alternatively, the vocoder in the BSC 106 may be used to provide the various frame rates to the processor 606. Either way, the processor 606 may use this information to assign Walsh codes on a frame-by-frame basis.

The Walsh code assignments may depend on the soft handoff status of the subscriber station 104. If the subscriber station 104 is engaged in soft handoff, then the processor 606 may assign the subscriber station 104 a Walsh code from its allocated full rate Walsh based on the frame rate of each voice frame. Conversely, if the subscriber station 104 is not actively engaged in soft handoff, then the processor 606 may respond in one of two ways. Voice frames having a ⅛ frame rate would probably not receive a Walsh code assignment. These voice frames may be carried on the dedicated forward link traffic channel. Voice frames having a frame rate in excess of ⅛ may be assigned one or more Walsh codes from the unused Walsh space to support one or more supplemental forward link traffic channels.

The channel element 610 may provide various signal processing functions such as convolutional encoding including Cyclic Redundancy Check (CRC) functions, interleaving, scrambling with a long Pseudo-random Noise (PN) code, and modulation using Quadrature Phase Shift Keying (QPSK), 8-PSK, 16-QAM, or any other modulation scheme known in the art. The modulated voice frames may then be spread with Walsh codes, combined with other Walsh code channels, and quadrature modulated with short PN codes. The output of the channel element 610 may be provided to a transmitter 612 for filtering, amplification and upconversion to a carrier frequency before transmission over the forward link from the base station 108 to the subscriber station 104 via an antenna 614.

The manner in which the modulated voice frames are handled in the channel element 610 may depend on the soft handoff status of the subscriber station 104. If the subscriber station 104 is engaged in soft handoff, then the modulated voice frames may be spread with their respective Walsh code assignments on a frame-by-frame basis. Conversely, if the subscriber station 104 is not actively engaged in soft handoff, then the modulated voice frames may be handled in one of two ways. The channel element 610 may spread the modulated voice frames having a ⅛ frame rate with assigned low rate Walsh code to support a dedicated forward link traffic channel. Voice frames having higher rates may be separated into multiple data streams. The first data stream may be spread with the assigned low rate Walsh code for the dedicated forward link traffic channel, and the remaining data streams may be spread with the assigned Walsh codes for the supplemental forward link traffic channels. The full rate Walsh code from which the Walsh codes supporting the supplemental forward link traffic channels are derived may be signaled to the subscriber station 104. Alternatively, the subscriber station 104 may use blind rate and code detection to access the supplemental forward link traffic channels. In this embodiment, the complexity of the subscriber station 104 may be reduced by limiting the blind rate and code detection to a small pool of full rate Walsh codes. This pool of full rate Walsh codes may be signaled to the subscriber station 104 concurrently with the low rate Walsh code used to support the dedicated forward link traffic channel.

The signaling of the full rate Walsh code to a subscriber station which is not actively engaged in soft handoff may be accomplished in any number of fashions. By way of example, the full rate Walsh code may be signaled to the subscriber station on the dedicated forward link traffic channel. The signaling information may be included in an extension indicator appended to the payload. The length of the extension indicator will depend on the number of full rate Walsh codes. In the embodiments described thus far, the extension indicator may be 6-bits to cover $2^6$ full rate Walsh codes. The extension indicator may be set to some predetermined value to indicate a ⅛ frame rate. This means that the entire payload is carried on the dedicated forward link traffic channel, and there are no supplemental forward link traffic channels assigned. The extension indicator may be set to some other value to indicate a higher frame rate and identify the full rate Walsh code supporting the supplemental forward link traffic channels.

The channel element 610 may be configured to multiplex the payload between the dedicated and supplemental forward link traffic channels in many different ways. In the case of a full rate frame, the dedicated forward link traffic channel may be needed to carry a portion of the payload because the supplemental forward link traffic channels may only support a ⅞ frame rate. This limitation is the result of mapping the supplemental forward link traffic channels to unused Walsh codes in a single full rate Walsh, and may readily be seen from Table 2. A subscriber station in soft handoff will need at least a ⅛ rate Walsh code from its full rate Walsh code to support its payload, leaving only a ⅞ frame rate capability for assignment to a subscriber station with better geometry.

In the case of a ½ or ¼ frame rate, the multiplexing options may increase. Referring back to Table 2, one may readily see that the payload for a ½ rate voice frame may supported entirely by a supplemental forward link traffic channel using a Walsh code $(W_{128,2})_2$ having a length of 128. Alternatively, the payload may be multiplexed between the dedicated and supplemental forward link channels. The same holds true a ¼ rate voice frame. The payload for a ¼ rate voice frame may be supported entirely by a supplemental forward link using any of the following 256 length Walsh codes $(W_{256,2})_2$, $(W_{256,3})_2$, or $(W_{256,4})_2$, or may be multiplexed between the dedicated and supplemental forward link channels. In both scenarios, better efficiency may be achieved by confining the payload to a supplemental forward link traffic channel, thereby freeing up the dedicated forward link traffic channel for other use. However, to effectively exploit this method, the extension indicator should be placed on a separate channel. In addition, the extension indicator channel may be capable of being disabled. The extension indicator channel may also include a dedicated code indicator which indicates whether the dedicated forward link traffic channel is enabled or disabled. The possible cases (A, B, and C) are given below in Table 3.

TABLE 3

| Case | Dedicated Forward Link Traffic Channel | Extension Indicator Channel | Supplemental Forward Link Traffic Channels |
|---|---|---|---|
| A | Enabled | Disabled | Not Assigned |
| B | Disabled | Enabled | Assigned |
| C | Enabled | Enabled | Assigned |

The possible Walsh code assignments are given in Table 4 below using the conventions from FIG. 5. The non-applicable frame rates are referenced by N/A.

TABLE 4

| Case | Full Rate | Half Rate | Quarter Rate | Eighth Rate |
|---|---|---|---|---|
| A | N/A | N/A | N/A | $(W_{512,1})_1$ |
| B | N/A | $(W_{128,1})_2$ | $(W_{256,2})_2$ or $(W_{256,3})_2$ or $(W_{256,4})_2$ | N/A |
| C | $(W_{512,1})_1$ and $(W_{512,2})_2$ and $(W_{256,2})_2$ and $(W_{128,2})_2$ | $(W_{512,1})_1$ and $(W_{512,2})_2$ and $(W_{256,2})_2$ | $(W_{512,1})_1$ and $(W_{512,2})_2$ | N/A |

An alternative scheme may be implemented that tends to reduce the power consumed by the extension indicator channel. This may be achieved by assigning a default full rate Walsh code to each subscriber station having good geometry with the serving base station (i.e., subscriber stations not actively engaged in soft handoff). The default full rate Walsh code may be any full rate Walsh code, but typically it may be a full rate Walsh code assigned to a subscriber station in soft handoff. When the unused Walsh codes from the default full rate Walsh code are sufficient to support a supplemental forward link traffic channel, which together with the dedicated forward link traffic channel, may handle the frame rate, then the extension indicator channel may be disabled. The possible cases (A, B, C, D and E) are given below in Table 5.

TABLE 5

| Case | Dedicated Forward Link Traffic Channel | Extension Indicator Channel | Supplemental Forward Link Traffic Channels |
|---|---|---|---|
| A | Enabled | Disabled | Not assigned |
| B | Disabled | Disabled | Default Full Rate Walsh Code |
| C | Enabled | Disabled | Default Full Rate Walsh Code |
| D | Disabled | Enabled | Extension Full Rate Walsh Code |
| E | Enabled | Enabled | Extension Full Rate Walsh Code |

The possible Walsh code assignments are given in Table 6 below using the conventions from FIG. 5. The non-applicable frame rates for each case is referenced by N/A. The index identification outside the parenthesis has been modified to indicate whether the Walsh code is derived from the default (def.) or extension (ext.) full rate Walsh code.

TABLE 6

| Case | Full Rate | Half Rate | Quarter Rate | Eighth Rate |
|---|---|---|---|---|
| A | N/A | N/A | N/A | $(W_{512,1})_1$ |
| B | N/A | $(W_{128,1})_{2,def.}$ | $(W_{256,4})_{2,def.}$ | N/A |
| C | $(W_{512,1})_1$ and $(W_{512,2})_{2,def.}$ and $(W_{256,2})_{2,def.}$ and $(W_{128,2})_{2,def.}$ | N/A | N/A | N/A |
| D | N/A | $(W_{128,1})_{2,ext.}$ | $(W_{256,2})_{2,ext.}$ and $(W_{256,3})_{2,ext.}$ and $(W_{256,4})_{2,ext.}$ | N/A |
| E | $(W_{512,1})_1$ and $(W_{512,2})_{2,ext.}$ and $(W_{256,2})_{2,ext.}$ and $(W_{128,2})_{2,ext.}$ | $(W_{512,1})_1$ and $(W_{512,2})_{2,ext.}$ and $(W_{256,2})_{2,ext.}$ | $(W_{512,1})_1$ and $(W_{512,2})_{2,ext.}$ | N/A |

Figure 7:
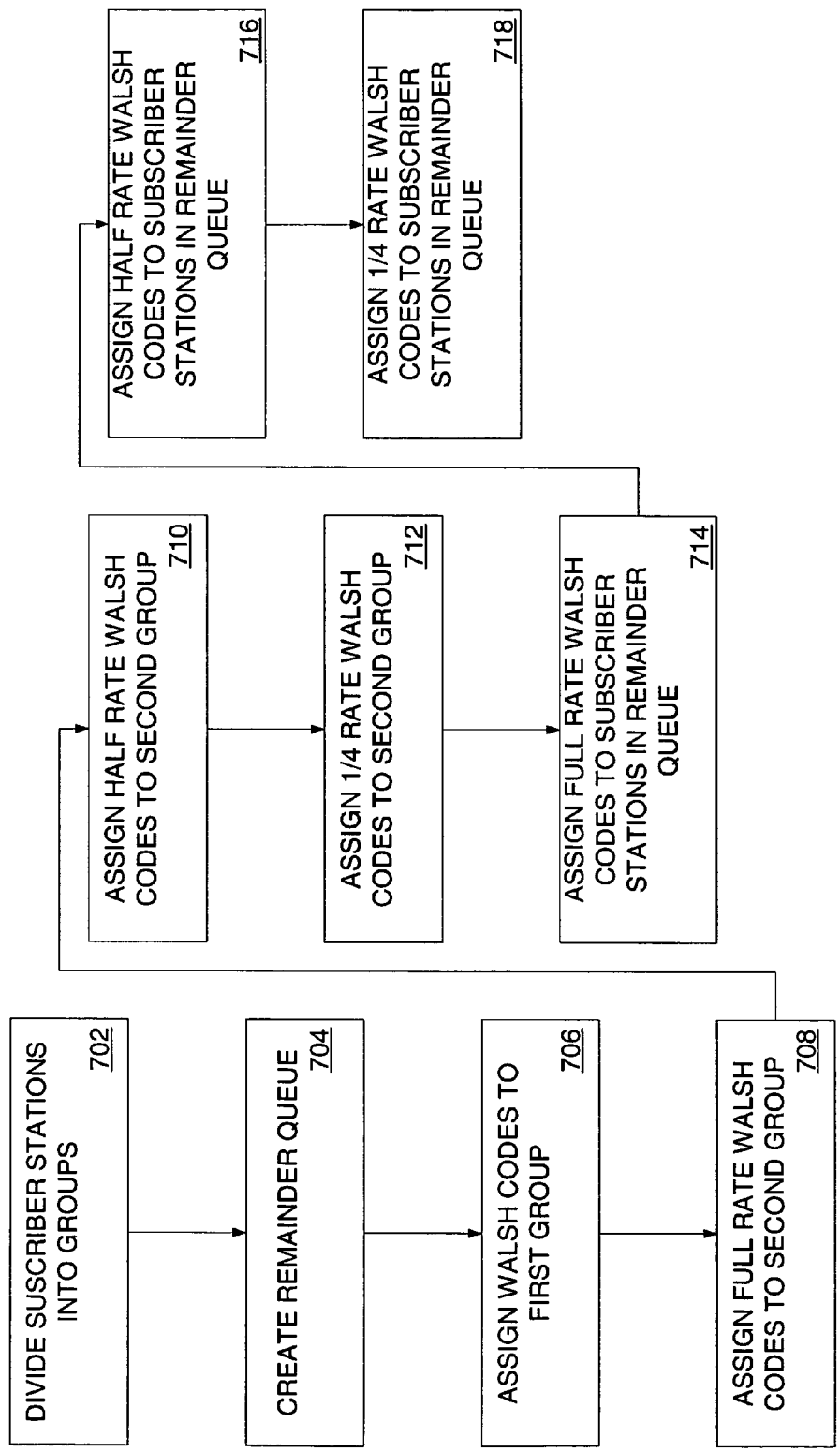
FIG. 7 is a flow diagram illustrating an embodiment of a processor algorithm used to assign Walsh codes in a CDMA communications system.

The processor 606 may be configured to implement any number of algorithms to perform Walsh code assignments on a frame-by-frame basis. An example of one algorithm will be described in connection with the Walsh code assignment scheme illustrated in Tables 5 and 6. Referring to FIG. 7, the processor may divide the subscriber stations into three groups in step 702. The first group includes all subscriber stations engaged in soft handoff. Each subscriber station in the first group may be assigned a full rate Walsh code. The second group includes a portion of the subscriber stations that are not engaged in soft handoff. Each subscriber station in the second group may be assigned a default full rate Walsh code. The third group includes the remaining subscriber stations that are not engaged in soft handoff. The subscriber stations in this group do not receive a default full rate Walsh code. The processor may be configured to assign the higher geometry subscriber stations into the third group.

In step 704, the processor may create a remainder queue, and place all subscriber stations in the third group in the remainder queue.

In step 706, the processor may assign to each subscriber station in the first group a Walsh code from its respective allocated full rate Walsh code.

In step 708, the processor may attempt to assign to each subscriber station in the second group, with a full frame rate requirement, Walsh codes from its respective default full rate Walsh code according to case C in Table 6. The subscriber stations in the second group requiring a full frame rate not supported by their default full rate Walsh code may be placed at the end of the remainder queue.

In step 710, the processor may attempt to assign to each subscriber station in the second group, with a ½ frame rate requirement, Walsh codes from its respective default full rate Walsh code according to case B in Table 6. The subscriber stations in the second group requiring a ½ frame rate not supported by their default full rate Walsh code may be placed at the end of the remainder queue.

In step 712, the processor may attempt to assign to each subscriber station in the second group, with a ¼ frame rate requirement, Walsh codes from its respective default full rate Walsh code according to case B in Table 6. The subscriber stations in the second group requiring a ¼ frame rate not supported by their default full rate Walsh code may be placed at the end of the remainder queue.

The processor may then attempt to assign Walsh codes from any full rate Walsh code to the subscriber stations in the remainder queue. First, in step 714, the processor may attempt to assign to each subscriber station in the remainder queue, with a full frame rate requirement, Walsh codes from any full rate Walsh code according to case E in Table 6.

Next, in step 716, the processor may attempt to assign to each subscriber station in the remainder queue, with a ½ frame rate requirement, Walsh codes from any full rate Walsh code according to case D or E in Table 6.

Finally, in step 718, the processor may attempt to assign to each subscriber station in the remainder queue, with a ¼ frame rate requirement, Walsh codes from any full rate Walsh code according to case D or E in Table 6.

Figure 8:
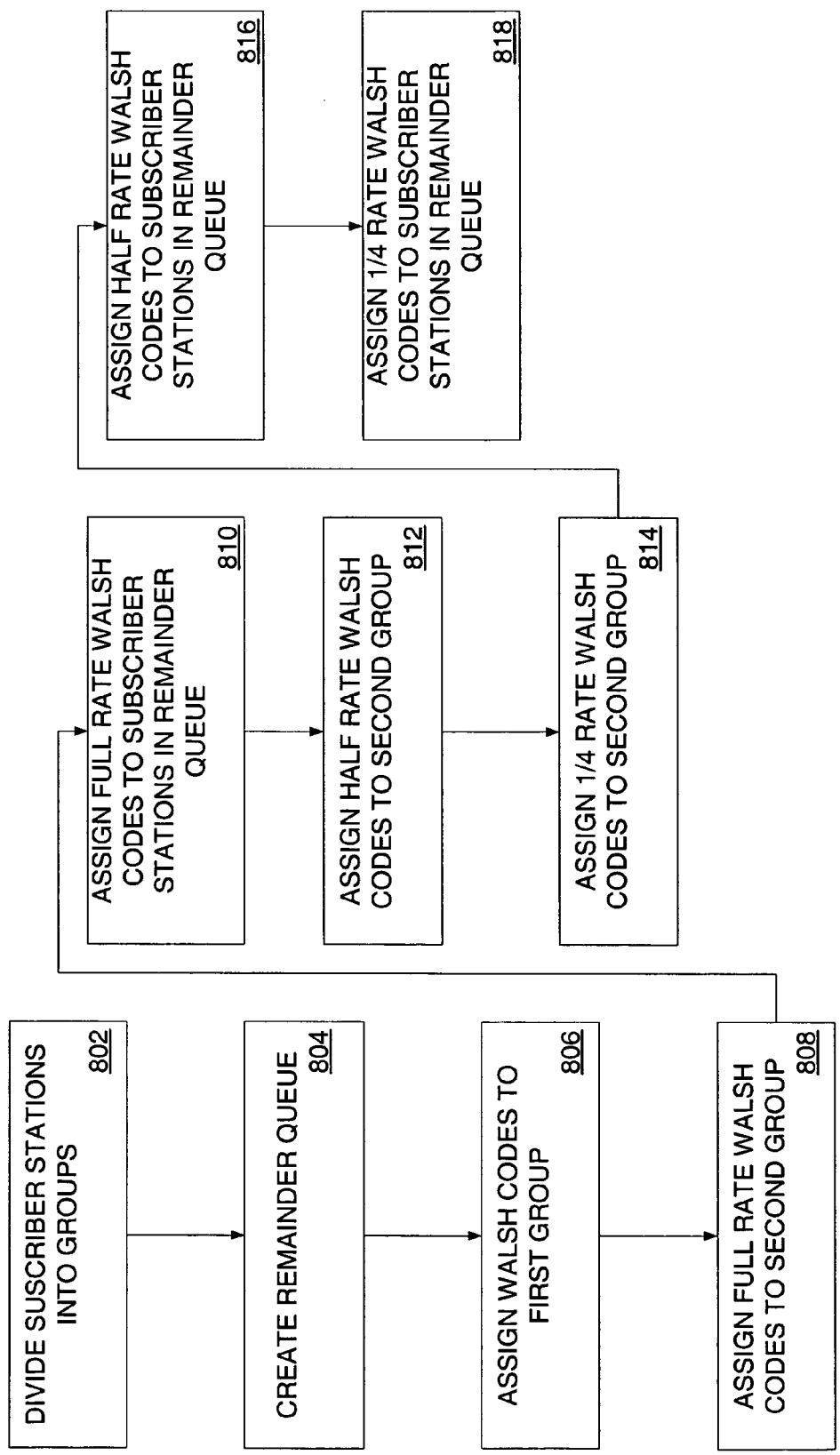
FIG. 8 is a flow diagram illustrating an alternative embodiment of a processor algorithm used to assign Walsh codes in a CDMA communications system.

Another algorithm that may be implemented by the processor to perform Walsh code assignments on a frame-by-frame basis will be described in connection with FIG. 8. Referring to FIG. 8, the processor may divide the subscriber stations its cellular region into three groups in step 802. The criteria for constructing the groups may be the same as described earlier in connection with FIG. 7.

In step 804, the processor may create a remainder queue, and place all subscriber stations in the third group in the remainder queue.

In step 806, the processor may assign to each subscriber station in the first group a Walsh code from its respective allocated full rate Walsh code.

In step 808, the processor may attempt to assign to each subscriber station in the second group, with a full frame rate requirement, Walsh codes from its respective default full rate Walsh code according to case C in Table 6. The subscriber stations in the second group requiring a full frame rate not supported by their default full rate Walsh code may be placed at the end of the remainder queue.

In step 810, the processor may attempt to assign to each subscriber station in the remainder queue, with a full frame rate requirement, Walsh codes from any full rate Walsh code according to case E in Table 6.

In step 812, the processor may attempt to assign to each subscriber station in the second group, with a ½ frame rate requirement, Walsh codes from its respective default full rate Walsh code according to case B in Table 6. The subscriber stations in the second group requiring a ½ frame rate that could not be supported by their default full rate Walsh code may be placed at the end of the remainder queue.

In step 814, the processor may attempt to assign to each subscriber station in the second group, with a ¼ frame rate requirement, Walsh codes from its respective default full rate Walsh codes according to case B in Table 6. The subscriber stations in the second group requiring a ¼ frame rate that could not be supported by their default full rate Walsh code may be placed at the end of the remainder queue.

In step 816, the processor may attempt to assign to each subscriber station in the remainder queue, with a ½ frame rate requirement, Walsh codes from any full rate Walsh code according to case D or E in Table 6.

In step 818, the processor may attempt to assign to each subscriber station in the remainder queue, with a ¼ frame rate requirement, Walsh codes from any full rate Walsh code according to case D or E in Table 6.

Although the procedures for making Walsh code assignments on a frame-by-frame basis have been illustrated through a sequence of steps, those skilled in the art will appreciate that the order of the steps are set forth by way of example and not by way of limitation. These steps may be performed in different orders, with some steps being performed in parallel. Moreover, one or more of these steps may be omitted or combined with any other techniques known in the art.

In the embodiments of the CDMA communication systems described thus far, the processor 606 has been located in the base station 108. However, the location of the processor 606 may ultimately depend on whether the management of the Walsh code space is part of a centralized or distributed system. By way of example, a distributed system may utilize a processor 606 in every base station 108. In this configuration, the processor 606 for each base station 108 determines the Walsh code assignments for the subscriber stations 104 within its cellular region. Conversely, a centralized system may utilize a single processor 606 in the BSC 106 to coordinate the Walsh code assignments for multiple base stations 108. As a practical matter, the processor 606 may be located in each base station to reduce the loading on the backhaul interface between the BSC 106 and the base stations. However, the processor 606 may be located anywhere in the access network. For the purposes of clarity, the processor 606 will reside in a communications station with the understanding that the communications station may be a base station, a BSC, or any other structure within the access network that houses the processor 606.

The processor 606 may be embodied in software capable of being executed on a general purpose processor, a specific application processor, or in any other software execution environment. In these embodiments, any reference to the term processor shall be understood to mean either the software alone, or the software in combination with the general purpose processor, specific application processor, or the software execution environment. The software may reside in RAM memory, flash memory, ROM memory, EPROM memory, EEPROM memory, registers, hard disk, removable disk, CD-ROM, or any other storage medium known in the art. Alternatively, the processor may be in implemented in hardware or in any combination of hardware and software. By way of example, the processor may be implemented with an application specific integrated circuit (ASIC), field programmable gate array (FPGA) or other programmable logic device, discrete gate or transistor logic, discrete hardware components, any combination thereof, or any other equivalent or non-equivalent structure designed to perform one or more of the functions disclosed herein. It is to be understood that the any reference to the term processor for managing Walsh code assignments may embrace all possible implementations disclosed herein as well as other embodiments that would be apparent to those skilled in the art.

Referring back to FIG. 6, the forward link transmission from the base station 108 may be received by an antenna 616 at the subscriber station 104 and coupled to a receiver 618 for filtering, amplification, and downconversion to a baseband signal. The baseband signal may be coupled to a demodulator 620 which provides various demodulation functions including quadrature demodulation using the short PN codes, despreading to recover the voice frames, and demodulation using the inverse modulation scheme employed at the base station (i.e., QPSK, 8-PSK, 16-QAM, or any other modulation scheme known). A decoder 622 may be used to provide various signal processing functions on the demodulated voice frames such as de-scrambling using the long PN code, de-interleaving, decoding, and performing a CRC check function on the decoded voice frames. A vocoder 624 may be used to convert the voice frames into PCM voice using a decompression algorithm compatible with the vocoder in the BSC 106.

The despreading function may depend on whether the subscriber station 104 is engaged in soft handoff. The soft handoff status of the subscriber station may be available through overhead messaging. If the subscriber station 104 is engaged in soft handoff, then it may combine communications from the various base stations during the decoding process to increase processing gain. Although the base stations may have allocated different full rate Walsh codes to the subscriber station 104, blind rate and code detection may still be used to despread the baseband signal without increasing the complexity beyond that which currently exists for legacy equipment as long as the voice frame from each base station has the same rate assignment. This is possible even if the rate assignments are carried out independently as long as the rate assignment algorithm is standardized. Assuming that the frame rate is the same, there is no ambiguity as to the Walsh code assignment from each base station.

The blind rate and code detection process for a subscriber station that is not actively engaged in soft handoff may be significantly different, and depend on the Walsh code assignment scheme used at the serving base station. By way of example, the dedicated forward link traffic channel may be despread using the low rate Walsh code assigned to the subscriber station 104. If an extension indicator is embedded in the dedicated forward link traffic channel, then the demodulator 620 may be able to determine whether a portion of the payload is carried by one or more supplemental forward link traffic channels. Alternatively, the demodulator 620 may access a separate overhead channel to recover the extension indicator. If the extension indicator channel is enabled, then the demodulator 620 may obtain the full rate Walsh code supporting one or more of the supplemental forward link traffic channels. The demodulator 620 may also be able access a dedicated code indicator on the extension indicator channel to determine whether the dedicated forward link traffic channel is being used. If, on the other hand, the extension indicator is disabled, then the demodulator 620 may determine that the entire payload is carried by the dedicated forward link traffic channel. In any event, the demodulator 620 may be able to determine the location of the payload within the confines of the Walsh code space.

The despreading function is rather trivial if the payload is confined to the dedicated forward link traffic channel. The demodulator 620 simply uses the low rate Walsh code assigned to the subscriber station 104 to extract the voice frame from the dedicated forward link traffic channel. However, the demodulator 620 may also be configured to access one or more supplemental forward link traffic channels. The full rate Walsh code identified from the extension indicator may be searched by the demodulator to find the appropriate Walsh codes. More specifically, the demodulator 620 may perform blind rate and code detection by despreading the baseband signal with the different Walsh codes derived from the full rate Walsh code identified by the extension indicator. For each of these Walsh codes, the de-spread baseband signal may be provided to the decoder 622. If the CRC check function is valid for the baseband signal, this means that a supplemental forward link traffic channel has been detected. This process continues until all the Walsh codes are searched. The payload portions from each of the dedicated and supplemental forward link traffic channels may then be combined and provided to the vocoder 624.

The various illustrative blocks, modules, algorithms and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside anywhere in the access network. In the alternative, the processor and the storage medium may reside as discrete components anywhere in the access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, comprising:
allocating a first code to a first subscriber station;
assigning a first sub-code derived from the first code to support a dedicated channel to the first subscriber station;
assigning a second code to support a dedicated channel to a second subscriber station; and
assigning a second sub-code derived from the first code to support a supplemental channel to the second subscriber station,
wherein the first and second sub-codes are restricted to lower data-rate transmissions as compared to the first code, and wherein the first subscriber station is in soft handoff and the second subscriber station is not in soft handoff.

2. The method of claim 1 further comprising assigning a third sub-code derived from the first code to support a second supplemental channel to the second subscriber station.

3. The method of claim 1 further comprising separating communications to the second subscriber station into first and second portions, spreading the first portion of the communications with the second code, and spreading the second portion of the communications with the second sub-code.

4. The method of claim 1 wherein the first sub-code comprises a plurality of concatenated copies of the first code.

5. The method of claim 1 further comprising signaling to the second subscriber station the first code.

6. The method of claim 1, wherein the first code corresponds to a first Walsh code of a first length, the first and second sub-codes of the first code correspond to sub-Walsh codes of a second length, the first and second sub-codes collectively constituting the first code, and wherein the second code corresponds to a second Walsh code of the first length.

7. A method of communications, comprising:
separating a plurality of subscriber stations into first and second groups;
allocating a different first code from a plurality of orthogonal codes to each of the subscriber stations in the first group;
assigning each of the subscriber stations in the first group either its allocated first code or a first sub-code derived from its allocated first code, to support a dedicated channel; and
assigning a second sub-code derived from one of the first codes to support a communications channel to one of the subscriber stations in the second group,
wherein the first and second sub-codes are restricted to lower data-rate transmissions as compared to their respective first code, and wherein the subscriber stations in the first group are in soft handoff and the subscriber stations in the second group are not in soft handoff.

8. The method of claim 7 further comprising assigning a second code to support a dedicated channel to said one of the subscriber stations in the second group, and wherein the communications channel comprises a supplemental channel to support overflow communications not supported by the dedicated channel.

9. The method of claim 8 further comprising separating communications to said one of the subscriber stations in the second group into first and second portions, spreading the first portion of the communications with the second code, and spreading the second portion of the communications with the second sub-code.

10. The method of claim 7 further comprising assigning a third sub-code from said one of the first codes to support a second communications channel to said one of the subscriber stations in the second group.

11. The method of claim 7 wherein the first sub-codes each comprises a plurality of concatenated copies of its respective first code.

12. The method of claim 7 further comprising signaling to said one of the subscriber stations in the second group said one of the first codes.

13. A communications station, comprising:
a processor configured to allocate a first code to a first subscriber station, assign a first sub-code derived from the first code to support a dedicated channel to the first subscriber station,
assign a second code to support a dedicated channel to a second subscriber station, and assign a second sub-code derived from the first code to support a supplemental channel to the second subscriber station,
wherein the first and second sub-codes are restricted to lower data-rate transmission as compared to the first code, and wherein the processor is further configured to receive information indicating that the first subscriber station is in soft handoff and that the second subscriber station is not in soft handoff, the allocation of the first code to a first subscriber station being based on the first subscriber station being in soft handoff, and the assignment of the second code to support the dedicated channel to a second subscriber station is based on the second subscriber station not being in soft handoff.

14. The communications station of claim 13 wherein the processor is further configured to assign a third sub-code derived from the first code to support a second supplemental channel to the second subscriber station.

15. The communications station of claim 13 further comprising a modulator configured to separate communications to the second subscriber station into first and second portions, spread the first portion of the communications with the second code, and spread the second portion of the communications with the second sub-code.

16. The communications station of claim 13 wherein the processor is further configured to derive the first sub-code by concatenating a plurality of copies of the first code.

17. The communications station of claim 13 wherein the processor is further configured to signal to the second subscriber station the first code.

18. A communications station, comprising:
a processor configured to separate a plurality of subscriber stations into first and second groups,
allocate a different first code from a plurality of orthogonal codes to each of the subscriber stations in the first group,
assign each of the subscriber stations in the first group either its allocated first code or a first sub-code derived from its allocated first code, to support a dedicated channel, and
assign a second sub-code derived from one of the first codes to support a communications channel to one of the subscriber stations in the second group,
wherein the first and second sub-codes are restricted to lower data-rate transmissions as compared to their respective first code, and wherein the processor is further configured to receive information indicating whether each of the subscriber stations are in soft handoff, and separate the subscriber stations by placing the subscriber stations in soft handoff in the first group and the subscriber stations that are not in soft handoff in the second group.

19. The communications station of claim 18 wherein the processor is further configured to assign a second code to support a dedicated channel to said one of the subscriber stations in the second group, and wherein the communications channel comprises a supplemental channel used by the processor to support overflow communications not supported by the dedicated channel.

20. The communications station of claim 19 further comprising a modulator configured to separate communications to said one of the subscriber stations in the second group into first and second portions, spread the first portion of the communications with the second code, and spread the second portion of the communications with the second sub-code.

21. The communications station of claim 18 further comprising assigning a third sub-code from said one of the first codes to support a second communications channel to said one of the subscriber stations in the second group.

22. The communications station of claim 18 wherein the first sub-codes each comprises a plurality of concatenated copies of its respective first code.

23. The communications station of claim 18 wherein the processor is further configured to signal to said one of the subscriber stations in the second group said one of the first codes.

24. A communications station, comprising:
means for allocating a first code to a first subscriber station;
means for assigning a first sub-code derived from the first code to support a dedicated channel to the first subscriber station;
means for assigning a second code to support a dedicated channel to a second subscriber station; and
means for assigning a second sub-code derived from the first code to support a supplemental channel to the second subscriber station,
wherein the first and second sub-codes are restricted to lower data-rate transmissions as compared to the first code, and wherein the first subscriber station is in soft handoff and the second subscriber station is not in soft handoff.

25. A communications station, comprising:
means for separating a plurality of subscriber stations into first and second groups;
means for allocating a different first code from a plurality of orthogonal codes to each of the subscriber stations in the first group;
means for assigning each of the subscriber stations in the first group either its allocated first code or a first sub-code derived from its allocated first code, to support a dedicated channel; and
means for assigning a second sub-code derived from one of the first codes to support a communications channel to one of the subscriber stations in the second group,
wherein the first and second sub-codes are restricted to lower data-rate transmissions as compared to their respective first code, and wherein the subscriber stations in the first group are in soft handoff and the subscriber stations in the second group are not in soft handoff.

26. A non-transitory computer-readable medium including program code stored thereon, which, when executed by a machine, cause the machine to perform actions, the program code promising:

program code to allocate a first code to a first subscriber station;

program code to assign first sub-code derived from the first code to support a dedicated channel to the first subscriber station;

program code to assign a second code to support a dedicated channel to a second subscriber station; and program code to assign a second sub-code derived from the first code to support a supplemental channel to the second subscriber station wherein the first and second sub-codes are restricted to lower data-rate transmission as compared to the first code, and wherein the first subscriber station is in soft handoff and the second subscriber station is not in soft handoff.

27. A non-transitory computer-readable medium including program code stored thereon, which, when executed by a machine, cause the machine to perform actions, the program code promising:

program code to separate a plurality of subscriber stations into first and second groups;

program code to allocate a different first code from plurality of orthogonal codes to each of the subscriber stations in the first group;

program code to assign each of the subscriber stations in the first group either its allocated first code or a first sub-code derived from its allocated first code, to support a dedicated channel; and program code to assign a second sub-code derived from one of the first codes to support a communications channel to one of the subscriber stations in the second group, wherein the first and second sub-codes are restricted to lower data-rate transmissions as compared to their respective first code, and wherein the subscriber stations in the first group are in soft handoff and the subscriber stations in the second group are not in soft handoff.

* * * * *